United States Patent Office 3,374,485
Patented Mar. 19, 1968

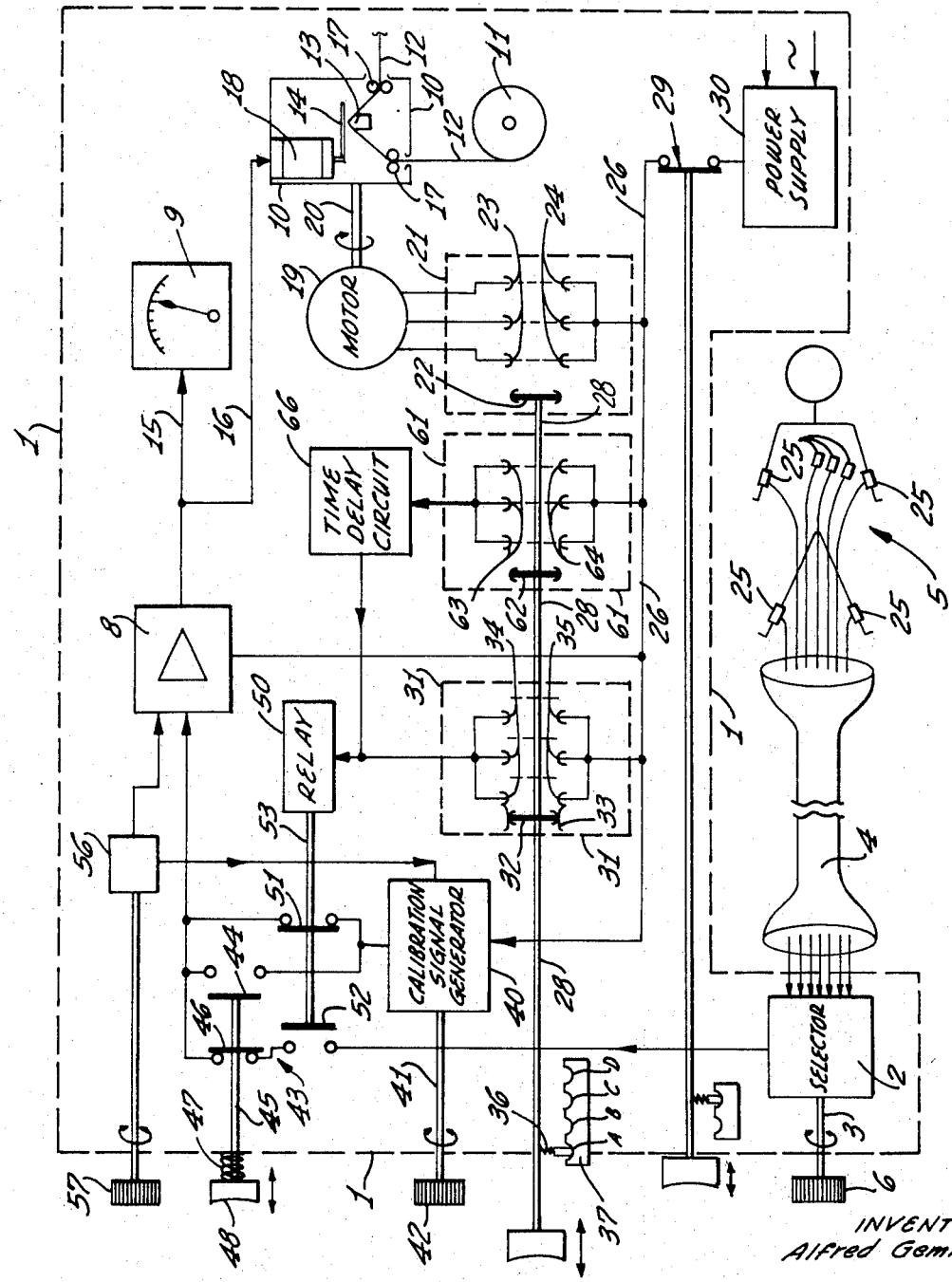

3,374,485
CALIBRATION APPARATUS FOR PHYSIOLOGICAL AND BIOLOGICAL MEASURING AND RECORDING DEVICES
Alfred Gemmer, Berlin-Frohnau, Germany, assignor to Fritz Hellige & Co. G.m.b.H., Freiburg im Breisgau, Germany
Filed Nov. 4, 1966, Ser. No. 592,037
Claims priority, application Germany, Nov. 5, 1965, H 57,599
10 Claims. (Cl. 346—23)

The present invention relates to measuring and/or recording devices associated with apparatus such as electrocardiographs and electroencephalographs and, more particularly, to apparatus for providing accurate and distinguishable calibration signals to such devices which measure and record signals of very small magnitude representing physiological and biological data.

Valuable physiological and biological information relating to the condition and operation of many human organs is gained by detecting, measuring and recording changes in electrical potential associated with human organs during their operation. In order to make the detected fluctuations in electric potential meaningful, the equipment used to monitor or record such changes must be supplied with a means of calibration which makes it possible to deduce or read out from a signal representing the changes in electrical potential the corresponding magnitude of the detected signal as related to the time of occurrence or amplitude of the calibration signal. Conventionally, calibration voltages are applied to the input of the recording instrument for this purpose.

For example, in the case of recording an electrocardiogram, it must be possible to supply a calibration voltage signal to the recording instrument during an interval in which recording occurs. Thus, a calibration signal generator generally is provided which operates to apply a calibration voltage to the electrocardiograph in such a manner that the calibration voltage signal can be inserted in the recording during any one of the operating phases of the electrocardiograph. In many instances, however, it is very difficult, if not impossible, to distinguish the calibration voltage signal from one of the plot traces on the electrocardiograph recording because the calibration voltage signal appears superimposed on the trace representing the data-bearing signal. A further disadvantage of such prior art devices resides in the fact that the act of applying calibration signals to the electrocardiograph must occur as a deliberately performed step. One can readily see, therefor, that this step easily could be omitted inadvertently. Any data thereafter recorded would be meaningless because of the lack of a calibration signal to which the recorded data signals, representing changes in electrical potential, could be compared.

Accordingly, it is an object of the present invention to increase the ability of one to distinguish between indicated or recorded calibration signals and the indicated or recorded data-bearing signals.

Another object of the present invention is to increase the ability of one to evaluate recorded data signals by providing a non-ambiguous calibration signal which can be correctly identified and which, if necessary, is available in connection with any and every phase of operation of the recording instrument.

In accordance with one aspect of the present invention, the foregoing objects are achieved by mechanizing a measuring and/or recording device to include an automatic switching mechanism responsive to movement of a motor control switch. In such an embodiment of the measuring and/or recording device, a shifting device couples the motor speed control switch to a relay which operates to interrupt the application of a selected data-bearing signal to the input terminal of a recording amplifier and to apply the output signal of a calibration signal generator to the input terminal of the recording amplifier at the beginning of every measuring operation or when a shift to a different running speed of the recording mechanism is effected. The apparatus of the present invention further operates to automatically return the relay switch to its initial position after a predetermined time interval, subsequent to switching to one of the available running speeds of the recording mechanism. Thus, during brief time intervals, the recording amplifier is disconnected from the selected data-bearing signals, and, instead, the recording amplifier is connected to the output of the calibration signal generator so that only the calibration signals are monitored or recorded. By constructing the measuring and/or recording device in the manner contemplated by the present invention, there is no chance that the calibration signal could be inadvertently omitted. As a result, non-ambiguous comparison values or calibration signals are available for determining the value of the selected data-bearing signals.

These and other advantages and features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only and are not intended as a definition of the limit of the invention.

In the drawing, the single figure schematically illustrates a measuring and recording device constructed in accordance with teachings of the present invention associated with an electrocardiograph 1, the single drawing illustrating those circuit components which are essential for an understanding of the invention.

It is the purpose of an electrocardiograph 1 to amplify and monitor the changes of electrical potential generated by the action of the heart of a human body 5, illustrated in the drawing, for the purpose of diagnosing irregularities of heart action. Thus, electrical potentials are detected at various locations on the human body 5 by means of a plurality of electrodes 25 that are generally attached to the four limbs and from various locations on the chest. Voltages are supplied by the electrodes 25 to a selector 2 through connecting lines grouped to form a patient cable 4. As is well known in the art, the selector 2 operates to produce predetermined combinations of the different potentials in accordance with a specific program for the purpose of supplying a signal to be measured either to separate amplifying channels or to a recording amplifier 8, as shown in the drawings. A switch (not shown), operated by a control knob 6 connected to a switch shaft 3, is included within the selector 2 for picking different combinations of body potential signals to be applied to the amplifier 8.

The body potential signal to be measured, in the form in which it appears as the output signal of the amplifier 8, is applied to an indicating instrument 9 and to a recording instrument 10 through wires 15 and 16, respectively. The recording instrument 10 is schematically illustrated to include a supply drum 11 carrying a tape-type recording medium 12. The recording medium 12 is caused to slide over a writing edge 13 by means of a plurality of driven rollers 17. A write-actuating mechanism 18 is responsive to the application of the body potential signal for moving a writing stylus 14 on the recording medium 12 for the purpose of recording the fluctuations of the body potential signal values. The power for driving the recording medium 12 over the writing edge 13 is supplied to the rollers 17 by an electric motor 19, having different distinct operating speeds, coupled to the rollers 17 by the shaft 20.

A four position speed selector switch 21 is provided for selecting any one of the different distinct operating speeds of the motor 19. The drawing illustrates switch 21 having a bridge contact element 22 coupled to a control shaft 28. The contact 22 can assume any one of four different positions, in three of which it connects one of three stationary motor contacts 23 to a corresponding one of three stationary power supply contacts 24 for causing the motor 19 to operate at different speeds depending upon the position of the bridge contact 22. In the fourth (or neutral) position, shown in the drawing, the bridge contact 22 does not engage any of the motor or power supply contacts, thereby causing the motor 19 to stop. The power supply contacts 24 are connected to a main power line 26 which is coupled to a power supply 30. The power supply 30 generally includes a transformer and a rectifier for converting standard A–C line voltage into low D–C voltages required to energize the electrocardiograph 1, including the motor 19. The power supply 30 may be disconnected from the main power line 26 by means of a power switch 29 which includes a bridge contact 27 for establishing connection or disconnection between the power supply 30 and the main power line 26.

In accordance with the present invention, the electrocardiograph 1 is also provided with a calibration signal generator 40 for producing calibration signals that may be applied to the input of the recording amplifier 8. The signal generator 40 includes a sensitivity adjusting switch (not shown), operable by a knob 42 through a shaft 41, for the purpose of adjusting the calibration value of the signal supplied by the signal generator 40 and bringing it into accordance with the selected rate of amplification for the body potential signals to be measured. In accordance with prior art arrangements, a calibration switch 43 is interposed between the selector 2 and the amplifier 8 for supplying the manual capability for applying a calibration signal to the input of the amplifier 8. A contact element 46 is coupled to a switch control rod 45 for effecting a connection between the selector 2 and the amplifier 8 when the control rod 45 is in its "normal" position, i.e., in a position such that a contact element 44, which is coupled to the switch control rod 45, is not connecting the calibration signal generator 40 to the amplifier 8. The contact element 44 effects a connection between the signal generator 40 and the amplifier 8 whenever one applies pressure to a pushbutton 48 connected to one end of the control rod 45. As indicated by the presence of a return spring 47, upon release of the pushbutton 48, the switch 43 disconnects the calibration signal generator 40 from the amplifier 8 and tends to provide a continuous circuit from the selector 2 to the amplifier 8.

An additional feature which is provided in accordance with teachings of the present invention resides in the presence of a relay 50 having two switch contact elements 51 and 52. Both switch contact elements 51 and 52 are connected to a relay armature 53 such that, when the relay 50 is energized, one of the two contact elements 51 and 52 operates to close the circuit with which it is associated, while the other one of the two contacts disconnects the circuit with which it is associated. Specfically, the switch element 52 is inserted in the circuit between the selector 2 and the input to the amplifier 8 for the purpose of breaking the continuity of this circuit when the relay 50 is energized. The switch element 51 is associated with the circuit between the calibration signal generator 40 and the input to the amplifier 8 in order to close this circuit upon energization of the relay 50.

The operation of the relay 50 is controlled by a pair of switches 31 and 61, the switch 61 interconnecting the main power line 26 and the relay 50 through a time delay circuit 66. The switch 31, on the other hand, couples the relay 50 directly to the main power line 26. It should be noted that the switch 61 is adapted to have four switch positions (a neutral position and three operative positions) corresponding to the four positions of the motor speed selector switch 21. The drawing illustrates switch 61 as having a sliding bridge contact element 62 affixed to the control shaft 28 such that the bridge contact 62 can assume any one of three different operative positions. In each of the three operative positions the bridge contact connects one of three stationary contacts 63 to a corresponding one of three stationary power contacts 64. It will be noted that, because the shaft 28 is common to both switches 21 and 61, when the shaft 28 is moved such that the bridge contact 22 (of the switch 21) interconnects the first pair (counting from the left, as shown in the drawing) of contacts 23 and 24 of switch 21, the bridge contact 62 of the switch 61 interconnects the first pair of contacts 63 and 64 of switch 61. An analogous result obtains when the shaft 28 is moved such that the bridge contact 22 interconnects the second or third pair (counting from the left, as shown in the drawing) of stationary contacts 23 and 24 of the switch 21.

The construction of the switch 31, as may be seen in the drawing, is somewhat different from the construction of the switches 21 and 61. More particularly, the switch 31 is constructed so as to have three stationary contacts 34 (connected to the relay 50) and three stationary power contacts 35 (connected to the main power line 26). A sliding bridge contact 32 is affixed to the common control shaft 28 and moves between the stationary contacts for momentarily engaging one of the contacts 34 with one of the contacts 35. For example, assume that the control shaft 28 has been moved to a position so that the bridge contact 22 (of the switch 21) is engaging the second motor contact 23 and the second stationary contact 24. When the shaft 28 is in such a position, the bridge contact 32 (of the switch 31) will be in a position intermediate the second and third stationary contact 34 and the second and third power contact 35 (of the switch 31) and will not be touching any of these contacts. Assume, however that the control shaft 28 subsequently is moved for causing the bridge contact 22 to disengage from the second pair of contacts 23 and 24 and to engage with the third pair of contacts 23 and 24 (of switch 21). As the bridge contact 22 moves from the former position to the latter, the bridge contact 32 of the switch 31 will momentarily engage the third pair of contacts 34 and 35 of the switch 31. As the bridge contact 22 (of the switch 21) engages the third pair of contacts 23 and 24, the bridge contact 32 (of the switch 31) will disengage the third pair of contacts 23 and 24 and will come to a position (as indicated by a dotted line in the drawings) to the right of the third set of stationary contacts 34 and 35. The effect of this momentary engagement and subsequent disengagement of the contacts of switch 31 will be explained in the description which hereinafter follows.

Assuming now that the electrocardiograph 1 is to be operated, the power switch 29 is moved to the position shown in the drawing. It can be seen that relay 50 is immediately energized through the switch 31, even though the speed selector switch 21 is in its "neutral" position. This result is accomplished by the attachment of a pair of contact arms 33 to respective ones of the first set of stationary contacts 34 and 35. The contact arms 33 engage the bridge contact 32 even when the other associated switches 21 and 61 are in their respective neutral postions. Current flows from the power supply 30, through the main power line 26 and a first contact 35 (of the switch 31), and through a corresponding first contact 34 to the relay 50. As the relay 50 is energized, the armature 53 moves so as to cause the bridge contact 51 to connect the calibration signal generator 40 to the amplifier 8 and the bridge contact 52 to disconnect the selector 2 from the amplifier 8. Thus, the calibration signal, rather than a body potential signal to be measured, is applied to the input of the amplifier 8, and the indicating instrument 9 immediately monitors the value of the calibration signal, i.e., even prior to the recording of any sagnal to be measured. Simultaneously, the write-actuating mechanism 18 of the recording instrument 10 causes the stylus 14 to trace the value of the calibration signal on the recording medium 12. Until the bridge contact 22 of the motor speed selector switch 21 is moved from the position shown in the drawing to a position engaging a pair of contacts 23 and 24, the signal monitored by the indicating instrument 9 and the recording instrument 10 will be the calibration signal.

Assume that the motor 19 is then energized, for example, by moving the control shaft 28 (common to the three switches 21, 31 and 61) to the right one position so that a spring-loaded detent pin 36 disengages from a detent A in a detent block 37 and engages in a detent B in the detent block 37. By such movement of the control shaft 28, the bridge contact 22 interconnects the first pair of contacts 23 and 24 of the switch 21. Simultaneously, the sliding bridge contact 32 is disengaged from the contact arms 33, momentarily interconnects the first pair of contacts 34 and 35, and comes to rest at a position intermediate the first and second pairs of contacts 34 and 35 (counting from the left in the drawing). In this position the sliding bride contact 32 is completely free from any electrical contact with the adjacent terminals. However, the sliding bridge contact 62, which is also connected to the control shaft 28, engages the first pair of contacts 63 and 64 for the purpose of supplying the relay 50 with a holding current flowing from the main power line 26 through the switch 61 and the time delay circuit 66 to the relay 50. The time delay circuit 66 causes the holding current to flow through the relay 50 for a predetermined short time interval (for example, several seconds). By this means the switches 51 and 52 associated with the relay 50 cause a calibration signal to be applied to the recording amplifier by itself for the predetermined short time interval. After the predetermined time interval has elapsed, the time delay circuit 66 interrupts the flow of holding current and the relay 50 is de-energized, thereby reconnecting the selector 2 to the amplifier 8. The same conditions prevail during any subsequent step of switching to different speeds of the driving motor 19 (of the recorder 10) by actuating the speed selector switch 21.

In one embodiment of the invention, the time delay circuit 66 may take the form of a capacitor that has a predetermined time constant and which draws a charging current and supplies the relay switch 13 with such charging current. This condition continues until the capacitor has reached a voltage level corresponding to its full capacity. During the charging time interval, the current decreases until it reaches a certain threshold level below which the current being supplied by the capacitor is insufficient to retain relay 50 in its energized state. Thereafter, the switches 51 and 52 return to their rest position so that the calibration signal generator 40 is disconnected from the amplifier 8 and the amplifier is again connected to the selector 2. Alternatively, the time delay circuit 66 may take the form of a monostable multivibrator which returns from its operating condition to its rest condtiion after an adjustable time interval for interrupting the current flowing from the main power line 26 to the relay 50.

The operations recited hereinabove are repeated upon each occasion where switching occurs between distinct motor speeds no matter in what possible sequence the stationary motor contacts 23 are coupled to the main power supply to adjust the motor running speed. Even subsequent to a disconnection of the recording drive motor 19 from the main power line 26, the calibration signal is supplied to the amplifier 8 in an automatic manner, independently from the postiion of the speed selector switch 21, through the contact arms 33 of the switch 31 until the power switch 29 is opened.

It is to be understood that the above-described arrangements are illustrative of the application of the principals of the invention. Numerous other arrangements may be devised by those skilled in the art without departing from the spirit and scope of the invention. This by way of example and not of limitation, in accordance with a further development of the concept of the present invention, the calibration signal generator 40 may be an astable multivibrator which applies rectangular-shaped pulses of predetermined duration, such duration being adjustable by actuation of the switch coupled to switch shaft 41. Within a well-defined interval of time, during which the calibration signal is automatically supplied to the input of amplifier 8, several such rectangularly-shaped pulses could be supplied. The level of these rectangular pulses would be a measure of the selected amplification or sensitivity, whereas the length of the pulses would be a measure of the selected running speed of the motor 19.

It may be further desirable to retain the conventional, manually-operable calibration switch 43 so that the calibration signal may be supplied to the amplifier 8 and inserted into the trace on the recording medium 12 at any time during a measuring operation. This can bed one with or without an accompanying disconnection of the amplifier 8 from the selector 2 by the relay 50.

It also may be believed advisable to provide a control for the rate of amplification or sensitivity of the amplifier 8. Such a control device 56 (operated by a control knob 57) may be coupled to the amplifier 8 and the calibration signal generator 40 so that, as the rate of amplification is adjusted, the amplitude of the calibration signal may also be adjusted. Such an arrangement is indicated in the drawing.

The improved automatically operating calibration system contemplated by the present invention presents an essential advantage to the physician, inasmuch as the calibration pulses may be readily distinguished from the trace made in response to the body potential signals to be measured. Furthermore, the automatically operating system of the present invention precludes the possibility of the calibration signal being inadvertently omitted prior to the start of a measuring operation. Rather, every operating phase must include, of necessity, a recording of the calibration signal. Accordingly, from the foregoing, it is evident that various changes may be made without departing from the spirit of the invention as defined in the appended claims.

What is claimed as new is:

1. A system for monitoring and recording electrical signals comprising:
  a selector receiving a first plurality of electrical signals for producing an output signal corresponding to preselected ones of said electrical signals;
  a monitoring instrument for indicating the value of applied signals, said monitoring instrument including a recording medium and a drive mechanism for moving said recording medium at a second plurality of distinct speeds;
  a signal generator for producing a calibration signal distinguishable from said output signal of said selector;
  control means for energizing said monitoring instrument, said signal generator, and said drive mechanism and for changing the speed at which said drive mechanism moves said recording medium; and
  shifting means having input terminals respectively coupled to said control means and to the output terminals of said selector and said signal generator for normally applying said output signal of said selector to said monitoring instrument and, in response to the energization of said drive mechanism or a change in the operating speed thereof, automatically interrupting the application of said output signal to said monitoring instrument and applying said calibration signal to said monitoring instrument for a predetermined interval of time.

2. A system for monitoring and recording electrical signals as defined in claim 1 wherein said control means includes a power supply and actuating means for connecting said power supply to said indicating instrument and said signal generator and selectively to said drive mechanism, and wherein said shifting means includes a first switch means coupled to said actuating means and responsive to the connection of said power supply to said indicating instrument and said signal generator for interrupting the application of said output signal to said monitoring instrument and applying said calibration signal to said monitoring instrument.

3. A system for monitoring and recording electrical signals as defined in claim 2 wherein said shifting means further includes a second switch means coupled to said control means and said first switch means and responsive to the energization of said drive mechanism or a change in the operating speed of said drive mechanism for causing said first switch means to interrupt for a predetermined interval of time the application of said output signal to said monitoring instrument and to apply said calibration signal to said monitoring instrument for said predetermined interval of time.

4. A system for monitoring and recording electrical signals as defined in claim 3 wherein said control means includes a third switch for applying power to said drive mechanism and for changing the operating speed of said drive mechanism, and wherein a fourth switch couples said first switching means to said actuating means, said second switch means, said third switch and said fourth switch being mechanically coupled to one another for co-operation.

5. In a system for monitoring and recording electrical signals, said system including a selector circuit for receiving a first plurality of electrical signals and producing an output signal representing a combination of preselected ones of said electrical signals, a signal generator for producing a calibration signal, and a recording instrument having a recording medium and a drive mechanism for moving said recording medium at a second plurality of distinct speeds, the combination comprising:

means for energizing the system;
control means for changing the operating speed of the drive mechanism;
switching means coupled to the selector circuit and the signal generator for normally applying the output signal of the selector circuit to the recording instrument; and
shifting means responsive to the energization of the system or to a change in the operating speed of the drive mechanism for causing said switching means to interrupt the application of the output signal of the selector circuit to the recording instrument and to apply the calibration signal to the recording instrument.

6. The combination as defined in claim 5 wherein said control means includes a first switch having a first engaging member and a second plurality of stationary contacts, said first engaging member being movable from a neutral position to any one of a second plurality of positions in which said first engaging member contacts a corresponding one of said stationary contacts, the drive mechanism being operable at a different speed depending upon which one of said stationary contacts said first engaging member is contacting, and wherein said shifting means includes a second switch having first contact means for coupling said second switch to said switching means, second contact means for coupling said second switch to said energizing means, and a second engaging member movable from a neutral position to any one of a second plurality of positions in which said second engaging member interconnects said first and second contact means, said second engaging member being coupled to said first engaging member for simultaneous movement therewith.

7. The combination as defined in claim 5 wherein said shifting means includes a time delay circuit and a switch, said switch having first contact means for coupling said switch to said time delay circuit, second contact means for coupling said switch to said energizing means, and an engaging member coupled to said control means, said energizing member being movable from a neutral position to any one of a second plurality of positions in which said engaging member interconnects said first and second contact means, each of said second plurality of positions being related to a distinct operating speed of the drive mechanism, said time delay circuit being interposed between said first contact means and said switching means and responsive to movement of said engaging member from one position to another for energizing said switching means for a predetermined interval of time and causing said switching means to temporarily interrupt the application of the output signal of the selector circuit to the recording instrument and to apply the calibration signal to the recording instrument for said predetermined interval of time.

8. The combination as defined in claim 6 wherein said first contact means includes a time delay circuit responsive to movement of said second engaging member from one position to another for energizing said switching means for a predetermined time interval and causing said switching means to temporarily interrupt the application of the output signal of the selector circuit to the recording instrument and to apply the calibration signal to the recording instrument for said predetermined time interval.

9. The combination as defined in claim 8 wherein said shifting means further includes a third switch having a second plurality of first fixed contacts coupled to said switching means, a second plurality of second fixed contacts coupled to said energizing means, and a third engaging member movable between a third plurality of positions, each of said first fixed contacts being located opposite a corresponding one of said second fixed contacts, said third plurality of positions corresponding in number to said second plurality of positions in said second switch and each being located intermediate respective ones of said first and second fixed contacts, said third engaging member being coupled to said first and second engaging members and being movable therewith for momentarily interconnecting one of said first fixed contacts and a corresponding one of said second fixed contacts as said third engaging member moves from one position to another, said third engaging member interconnecting a first one of said first fixed contacts and a first one of said second fixed contacts when said first and second engaging members are in their respective neutral positions, thereby coupling said switching means to said energizing means when the drive mechanism is stopped.

10. The combination as defined in claim 8 wherein said switching means comprises a relay-type switch.

References Cited
UNITED STATES PATENTS 2,627,267   2/1953   Marchand    128—2.06
2,655,425   10/1953   Wood    346—23
2,660,165   11/1953   Miller    128—2.06

RICHARD B. WILKINSON, *Primary Examiner.*

JOSEPH W. HARTARY, *Assistant Examiner.*